United States Patent [19]

Janke

[11] Patent Number: 4,682,474
[45] Date of Patent: Jul. 28, 1987

[54] TEMPERATURE RESPONSIVE BAFFLE CONTROL CIRCUIT FOR A REFRIGERATOR

[75] Inventor: Donald E. Janke, Benton Township, Berrien County, Mich.

[73] Assignee: Whirlpool Corporation, Benton Harbor, Mich.

[21] Appl. No.: 889,963

[22] Filed: Jul. 28, 1986

[51] Int. Cl.⁴ .................... F25D 17/04; F24F 7/00
[52] U.S. Cl. ................................... 62/187; 236/46 F; 236/49
[58] Field of Search ............... 62/187, 186; 236/46 F, 236/1 B, 49; 251/129.1; 361/161, 162, 163, 164, 165, 166, 168.1, 169.1

[56] References Cited

U.S. PATENT DOCUMENTS

| | | | |
|---|---|---|---|
| 3,149,293 | 9/1964 | Farkas | 236/46 F X |
| 4,282,720 | 8/1981 | Stottmann et al. | 62/180 |
| 4,308,567 | 12/1981 | Mark | 361/187 |
| 4,409,639 | 10/1983 | Wesner | 361/167 |
| 4,450,897 | 5/1984 | Iijima et al. | 165/2 |

Primary Examiner—Harry Tanner
Attorney, Agent, or Firm—Wood, Dalton, Phillips, Mason & Rowe

[57] ABSTRACT

A circuit for controllably positioning an air baffle to control flow of air from a freezer compartment to a fresh food compartment of a refrigeration apparatus. The circuit energizes a first solenoid coil to close the baffle when the temperature sensed in the fresh food compartment is lower than a desired temperature and energizes a second solenoid to open the baffle when the temperature sensed is greater than the set point temperature. A capacitor, acting as a timer, carries a charge providing a voltage which eventually exceeds a voltage generated according to either the set point or the sensed temperature. If the capacitor voltage exceeds the sensed temperature voltage the open solenoid coil is energized. If the capacitor voltage exceeds the set point voltage the close solenoid coil is energized. Each solenoid is selectively energized when a charge on the capacitor is transferred through the solenoid, thereby discharging the capacitor and resetting the timer. The operation is repetitively performed to control the temperature in the fresh food compartment of the apparatus.

18 Claims, 4 Drawing Figures

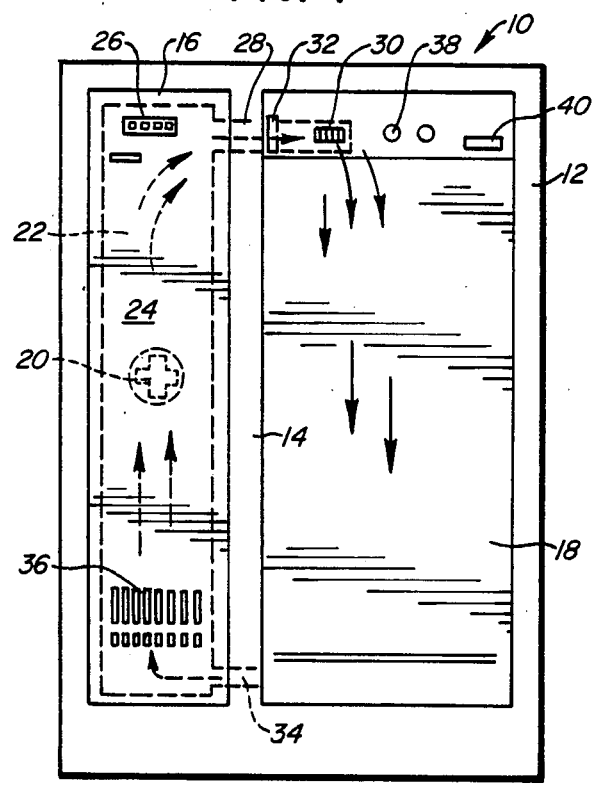
FIG. 1
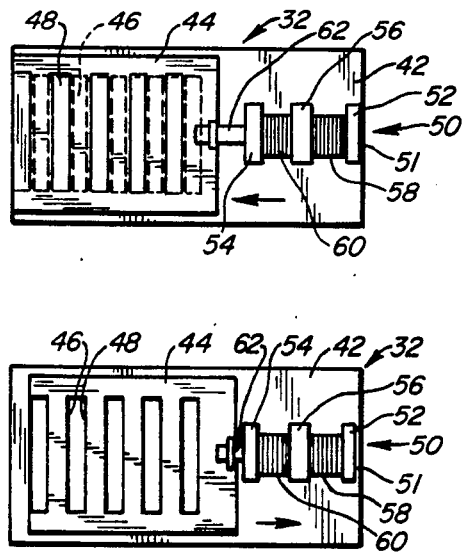
FIG. 2 (CLOSED)
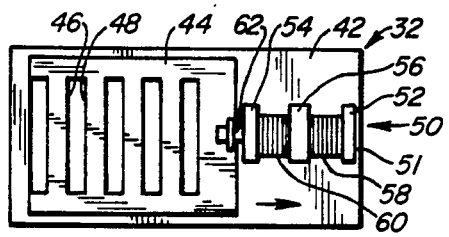
FIG. 3 (OPEN)
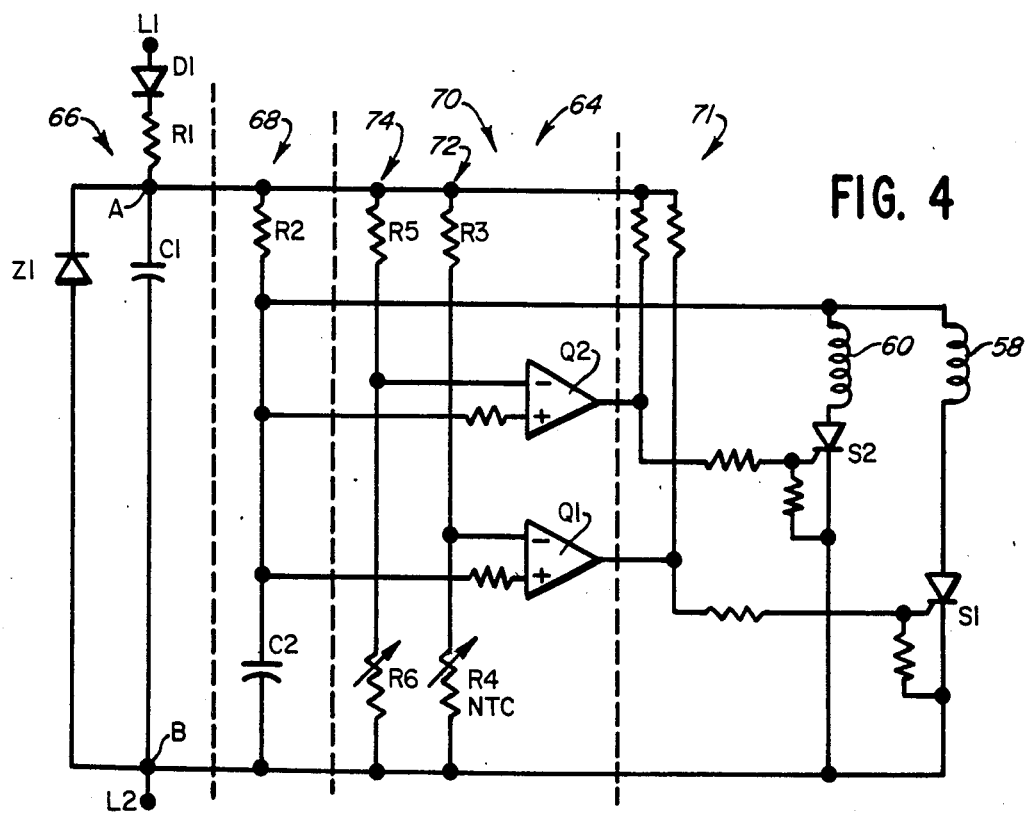
FIG. 4

TEMPERATURE RESPONSIVE BAFFLE CONTROL CIRCUIT FOR A REFRIGERATOR

BACKGROUND OF THE INVENTION

1. Field of the Invention

This invention relates generally to refrigerator controls, and more particularly, to an improved circuit for controlling temperature in a fresh food compartment of a refrigerator.

2. Description of Background Art

Conventional dual compartment refrigerators of the forced air circulation type utilize a single evaporator and evaporator fan for cooling a freezer compartment thereof. The freezer compartment is coupled by means of a passage through a divider wall to a fresh food compartment. A controllable damper located within the passage is operated by a control to control the passage of refrigerated air into the fresh food compartment. Such an arrangement is shown in Tershak et al application Ser. No. 588,304 filed Mar. 12, 1984, assigned to the assignee of the present invention.

One air damper and control for controlling passage of refrigerated air through such a passage is illustrated in Stottmann et al U.S. Pat. No. 4,282,720. The damper disclosed therein comprises a ratchet operated actuator coupled to a valve. Successive actuations of a single solenoid acting on the actuator cause the valve to move from an open to a close position, or alternately from a close to an open position. Such an arrangement is disadvantageous in reliance on a complicated mechanical actuation means subject to physical wear and tear shortening the useful life thereof The present invention overcomes this vexatious problem of the prior refrigerator temperature controls, in a novel and simple manner.

SUMMARY OF THE INVENTION

In accordance with the present invention, a control circuit is provided for controlling the temperature of a refrigeration apparatus chamber which causes an air baffle to be operated in a novel and simple manner to control passage of air through a transfer passage.

Broadly, there is disclosed herein a novel control circuit for a refrigeration apparatus having a source of cooling for cooling a compartment thereof. Means defining a passage from the cooling source to the compartment includes a baffle, the baffle having closed and open positions. First and second solenoid coils are provided for moving the baffle between the open and closed positions, respectively.

The control circuit controls energization of the solenoid coils. Temperature sensing means are provided for generating a voltage representing a temperature in the compartment. Also provided are set point means for generating a voltage representing a desired temperature in the compartment, as well as timer means for generating a voltage representing an elapsed time. First comparator means controllably energize the first solenoid coil to open the baffle when the timer means voltage exceeds the temperature sensing means voltage. Second comparator means controllably energize the second solenoid coil to close the baffle when the timer means voltage exceeds the set point means voltage. Means are also provided for resetting the elapsed time of the timer means when the timer voltage exceeds either the set point means voltage or the temperature sensing means voltage.

In the preferred embodiment, the baffle comprises both fixed and movable members. The fixed member includes a plurality of elongated apertures and corresponding elongated apertures are provided in the movable member. The movable member is slidably coupled to the fixed member. In the open position the apertures of the fixed and movable members are in substantial alignment, and in the closed position the apertures of the members are disaligned.

The movable member is coupled with an armature which is in magnetic relationship with the first and second solenoid coils. The solenoid coils are designed to operate the actuator, and thus the movable member, selectively in opposite directions according to which solenoid coil is energized.

In the preferred embodiment, the timer means comprises a capacitor continually charged from a power source. The capacitor is coupled to the first and second solenoid coils. When a voltage across the capacitor exceeds the voltage for either the temperature sensing means or the set point means, selectively either the first or second coil is correspondingly enabled thereby causing the capacitor to transfer its charge through the enabled coil. Transfer of the charge causes the capacitor to discharge thus resetting its voltage to near zero while also energizing the solenoid coil.

Each comparator means includes an inverting input, a non-inverting input, and an output. In the preferred embodiment, the capacitor is coupled to the non-inverting input of each comparator. The temperature sensing means is coupled to the inverting input of the first comparator means, and the set point means is coupled to the inverting input of the second comparator means.

A silicon controlled rectifier (SCR) is coupled between the output of each comparator and its associated solenoid for controllably enabling the solenoid coil when the voltage present at the non-inverting input is higher than the voltage present at the inverting input of its associated comparator.

Further features and advantages of the invention will readily be apparent from the specification and from the drawings.

BRIEF DESCRIPTION OF THE DRAWINGS

FIG. 1 is a front elevation of a refrigerator having a control circuit embodying the invention, the compartment doors being omitted to facilitate illustration of the components therein;

FIG. 2 is an elevation of a baffle according to the present invention in a closed position;

FIG. 3 is an elevation of the baffle in an open position; and

FIG. 4 is an electrical schematic of the control circuit.

DETAILED DESCRIPTION OF THE PREFERRED EMBODIMENT

Referring to FIG. 1, a refrigeration apparatus, such as a refrigerator/freezer, 10 includes a control according to the present invention. The invention is shown utilized with a side-by-side refrigerator/freezer; however, other types of refrigeration apparatus may be used in conjunction with the control of the present invention, as will be obvious to those skilled in the art.

Refrigerator/freezer 10 includes a cabinet 12 provided with an insulating separator, or divider wall, 14 defining a below-freezing, or freezer, compartment 16 and a fresh food, or above-freezing, compartment 18. Suitable doors (not shown) may be provided for selective access to the freezer and fresh food compartments 16, 18.

The freezer and fresh food compartments 16, 18 are cooled by circulating air therethrough which has been refrigerated as a result of being passed in heat exchange relationship with a conventional evaporator (not shown). An evaporator fan 20 delivers the cooled air through a duct 22 behind a rear wall 24 of the freezer compartment 16 and further duct through a freezer compartment discharge outlet 26. Duct 22 is also coupled through a passage 28 in the divider wall 14 to a fresh food compartment discharge outlet 30.

A selectively positionable baffle 32 is located within the passage 28 and is operated by the control of the present invention to control the passage of refrigerated air into the fresh food compartment 18. Refrigerated air that passes through the passage 28 circulates within the fresh food compartment and returns to the evaporator compartment through a return air duct 34 located in the bottom rear portion of the fresh food compartment 18. The refrigerated air in the freezer compartment 16 returns to the evaporator compartment through an inlet 36 and mixes with the air returned from the fresh food compartment. The mixed air is forced by the evaporator fan 20 over the evaporator during a cooling cycle to remove heat therefrom and recirculate the air in the compartments 16, 18.

In addition to the evaporator and evaporator fan 20, the refrigeration apparatus include connected components such as a compressor, a condensor, and condensor fan, (not shown) as will be obvious to those skilled in the art.

The desired temperature for the fresh food compartment 18 may be user-selected by means of a fresh food temperature set point control knob 38 which is shown as disposed within the fresh food compartment 18. Cooling of the fresh food compartment is controlled in accordance with the output from a fresh food compartment temperature sensor 40 which is positioned so as to sense the average temperature within the fresh food compartment 18.

Baffle 32 is illustrated in greater detail in FIGS. 2 and 3. FIG. 2 illustrates the baffle in a closed position wherein the baffle prevents refrigerated air from entering through the passage 28 into the fresh food compartment 18. FIG. 3 illustrates the baffle in an open position permitting refrigerated air to pass through the passage 28 into the fresh food compartment 18.

Baffle 32 includes a fixed member or plate 42 and a movable member or plate 44. The movable plate 44 is slidably affixed to the fixed plate 42 permitting straight line back and forth motion of the movable plate 44 with respect to the fixed plate 42. Fixed plate 42 includes a plurality of spaced elongated apertures 46 through which the refrigerated air may pass. Movable plate 44 includes corresponding spaced elongated apertures 48.

A bobbin 50 is fixed to the fixed plate 42. The bobbin 50 comprises a cylindrical insulator having a central longitudinal bore 51 extending therethrough. The bobbin 50 also include end plates 52, 54 and a central plate 56. A first or open solenoid coil 58 is wound about the bobbin 50 between the first end plate 52 and the central plate 56. A second or closed solenoid coil 60 is wound about the bobbin 50 between the second end plate 54 and the central plate 56.

An elongated iron core, or armature, 62 is affixed, to movable plate 44. The armature extends into the elongated bore 51 located in the bobbin 50 and is actuably movable therein.

The baffle 32 is encased in a housing, not shown, to overlay the passageway 28. The baffle 32 directs air flowing in the passageway 28 through the apertures 46, 48. In the closed position of FIG. 2, apertures 46, 48 are in disaligned relationship, thereby substantially preventing refrigerated air flow to the fresh food compartment 18. In the open position, FIG. 3, the apertures 46, 48 are substantially aligned permitting desired flow of refrigerated air to the fresh food compartment 18.

In operation, when the first solenoid coil 58 is energized electrical current through the coil 58 creates a magnetic field in the portion of bore 51 underlying coil 58 causing the armature 62, and thus also the movable plate 44, to move in the direction indicated by the arrow in FIG. 3 setting the baffle 32 to the open position. Conversely, when the second solenoid coil 60 is energized the current therein creates a magnetic field in the portion of bore 51 underlying coil 60 causing the armature 62, and thus the movable plate 44, to move in the direction indicated by the arrow in FIG. 2, thus setting the baffle 32 to the closed position.

The electrical schematic of a control circuit 64 according to the present invention is illustrated in FIG. 4. As shown, control circuit 64 includes a power supply circuit 66, a timer circuit 68, a bridge circuit 70 and a driver circuit 71.

Power supply circuit 66 includes a diode D1, a resistor R1 and a capacitor C1 serially coupled between terminals L1 and L2. A zener diode Z1 is coupled in parallel with the capacitor C1. When an AC power source, such as a standard 120 volt AC supply, is connected across terminals L1 and L2, a resulting DC voltage is present between terminals A and B. The level of the DC voltage is dependent upon the breakdown voltage of the zener diode Z1. In the illustrated embodiment the power supply circuit provides a 24 V DC supply.

Timer circuit 68 include a resistor R2 and capacitor C2 series coupled between the power supply terminals A and B. In the illustrated embodiment the resistor R2 comprises a 60 K resistor, and the capacitor C2 comprises a 100 microfarad capacitor, providing illustratively approximately one minute charge time across the capacitor C2. Capacitor C2 of timer circuit 68 generates an analog voltage representing a cycle time determined by the charge on the capacitor C2.

Bridge circuit 70 includes first and second voltage dividers 72 and 74. First voltage divider 72 has a fixed resistor R3 and a variable resistor R4 coupled between the power supply terminals A, B to an inverting input of a first comparator Q1. Second voltage divider 74 has a fixed resistor R5 and a variable resistor R6 coupled between the power supply terminals A, B to an inverting input of a second comparator Q2. A non-inverting input of each comparator Q1, Q2 is coupled to the capacitor C2. Each voltage divider 72, 74 generates an analog voltage represented by a voltage across the respective variable resistors R4, R6.

Each comparator Q1, Q2 has an output which assumes a high voltage state when a voltage present at its non-inverting input exceeds a voltage present at its inverting input. Conversely, the output of each comparator Q1, Q2 assumes a low voltage state when the voltage at its inverting input exceeds the voltage at its non-inverting input.

The variable resistor R4 represents a variable resistance output from the temperature sensor 40 previously described with reference to FIG. 1. In the preferred embodiment, the temperature sensor 40 is a negative temperature coefficient (NTC) sensing thermistor. Various other types of temperature sensors could also be utilized as would be apparent to one skilled in the art. The NTC provides a resistance which is inversely proportional to the temperature sensed.

The variable resistor R6 is a user-adjustable potentiometer which is mechanically linked to set point control knob 38. The resistance value across the resistor R6 is directly proportional to the desired temperature value selected by the user.

The driver circuit 71 includes the first and second solenoid coils 58, 60 each having one end coupled to the capacitor C2. Coupled between the other end of each coil 58, 60 and the terminal B is a silicon controlled rectifier (SCR) S1, S2 respectively. The output of each comparator Q1, Q2 is coupled, through appropriate resistive elements, to the gate of the SCR's S1, S2, respectively, for controllably switching same.

The operation of the control circuit 64 is described with the capacitor C2 initially being discharged. The voltage across the capacitor C2 increases over time as the capacitor C2 is charged through the resistor R2. Initially, therefore, the voltage at the non-inverting inputs of the comparators Q1, Q2 is relatively low. The voltage present at the inverting inputs of each of the comparators Q1, Q2 will depend on the resistance of the variables resistors R4, R6, respectively, but initially the voltage at each said inverting input is higher than the voltage at its associated non-inverting input, causing both outputs to be in their low voltage state. With the output of each comparator Q1, Q2 being in the low voltage state, neither SCR S1, S2 is conducting. Therefore, neither solenoid coil 58, 60 can be energized.

If the temperature sensed by the temperature sensor 40 is higher than the desired temperature set by the set point control knob 38 the resistor R4 will have a lower resistive value than the resistor R6. This is due to the fact that the resistance of the NTC is inversely proportional to the temperature. Correspondingly, the voltage at the inverting input of the first comparator Q1 will be lower than the voltage at the inverting input of the second comparator Q2. As the voltage across the capacitor C2 increases with time, eventually the voltage at the non-inverting inputs exceeds the voltage at the inverting input of the first comparator Q1. At that time the output of the first comparator Q1 assumes its high voltage state, causing the first SCR S1 to be switched on, enabling conduction through the first solenoid coil 58. The charge across the capacitor C2 is then transferred to the first solenoid coil 58, thereby energizing same. Energizing the first solenoid coil 58 actuably moves the baffle 32 to its open position permitting refrigerated air to flow into the fresh food compartment 18.

The transfer of the charge on the capacitor C2 to the solenoid coil 58 causes the voltage of capacitor C2 to approach zero. Thereafter, the voltage at the inverting input of the first comparator Q1 again exceeds the voltage at the non-inverting input resulting in the output thereof returning to its low voltage state. The SCR S1 remains latched on for a sufficient length of time to allow the capacitor C2 to discharge. The SCR S1 is then switched off, disabling the first solenoid coil 58.

Resistor R2 is of a sufficiently high value so that the power supply 66 does not latch SCR S1 in an energized state after capacitor C2 has discharged.

Capacitor C2 functions cyclically in the manner of a resettable timer. Capacitor C2 voltage increases with time as it is charged. Discharging the capacitor effectively resets the timer. Consequently, the capacitor C2 charge repeatedly cycles, energizing first solenoid coil 58 once during each generated cycle. The exact cycle time is determined according to the set point temperature, the actual temperature and the RC time constant of resistor R2 and capacitor C2.

As long as the temperature sensed by the sensor 40 exceeds the temperature set by the set point control knob 38, baffle 32 remains in the open position.

Subsequently, when the temperature sensed in the fresh food compartment 18 drops below the temperature value selected by user-adjustable resistor R6, the voltage at the inverting input of the second comparator Q2 is lower than the voltage at the inverting input of the first comparator Q1. Thereafter, as the voltage at the non-inverting input of the second comparator Q2 increases, due to the increasing charge on the capacitor C2, it eventually exceeds the voltage at the inverting input thereof and the output of the second comparator Q2 assumes its high voltage state, thereby switching on the second SCR S2. The second SCR S2 enables the second solenoid coil 60, causing the capacitor C2 to transfer its charge through the second solenoid coil 60, discharging the capacitor C2, and causing the baffle 32 to move to its closed position as shown in FIG. 2. Refrigerated air will then be prevented from flowing into the fresh food compartment 18. The second solenoid coil 60 is thereafter energized approximately once every minute, retaining the baffle 32 in the closed position.

As long as power is provided to the refrigerator 10 the baffle 32 operates in the controlled fashion as described above with the baffle being in the close position when the temperature in the fresh food compartment 18 is lower than its desired set-point temperature and the baffle 32 being in the open position when the temperature of the fresh food compartment 18 is greater than the desired setpoint temperature.

Thus, the invention broadly comprehends a control circuit for simply and reliably controlling the temperature in a refrigeration apparatus.

The foregoing disclosure of the preferred embodiment is illustrative of the broad inventive concepts comprehended by the invention.

I claim:

1. A control for a refrigeration apparatus having air cooling means and a compartment to be cooled by air delivered thereto from the air cooling means, said control comprising:

means defining an air flow passage between said air cooling means and said compartment;

baffle means for selectively opening or closing said air flow passage;

first and second alternatively operable solenoid means for moving said baffle means to selectively open and close said air flow passage;

temperature sensing means for sensing the temperature in said compartment and generating a voltage corresponding to the sensed temperature;

set point means for generating a voltage corresponding to a desired temperature;

timer means repeatedly generating a voltage representing a cycle time;

circuit means for comparing said voltage generated by said temperature sensing means with the voltage generated by said timer means, and comparing the voltage generated by said set point means with the voltage generated by said timer means, for selectively energizing either said first or said second solenoid coil once during each generated cycle time; and means for resetting said timer means to start a new cycle when said timer means voltage exceeds either said set point means voltage or said temperature sensing means voltage.

2. A control for a refrigeration apparatus having air cooling means and a compartment to be cooled by air delivered thereto from the air cooling means, said control comprising:

means defining an air flow passage between said air cooling means and said compartment;

baffle means for selectively opening or closing said air flow passage;

first and second alternatively operable solenoid means for moving said baffle means to selectively open and close said air flow passage;

temperature sensing means for sensing the temperature in said compartment and generating a voltage corresponding to the sensed temperature;

set point means for generating a voltage corresponding to a desired temperature;

timer means repeatedly generating a voltage representing a cycle time;

circuit means for comparing said voltage generated by said temperature sensing means, the voltage generated by said set point means, and with the voltage generated by said timer means for selectively energizing either said first or said second solenoid coil once during each generated cycle time, said circuit means including first comparator means associated with said temperature sensing means, said timer means, and said first solenoid means for controllably energizing said first solenoid means to selectively move said baffle to open said air flow passage when said timer means voltage exceeds said temperature sensing means voltage;

second comparator means associated with said set point means, said timer means and said second solenoid means for controllably energizing said second solenoid means to selectively move said baffle to close said air flow passage when said timer means voltage exceeds said set point means voltage; and means for resetting said timer means to start a new cycle when said timer means voltage exceeds either said set point means voltage or said temperature sensing means voltage.

3. The control according to claim 1 wherein said cycle has a length of time which varies according to said temperature sensing means voltage and said set point means voltage.

4. The control according to claim 1 wherein said timer means includes means for storing an electrical charge.

5. The control according to claim 4 wherein said timer means is coupled to said first and second solenoid coils whereby said charge is transferred from said timer means to either of said first or second solenoid means to energize either of said first or second solenoid means and reset said timer.

6. The control according to claim 4 wherein said timer means comprises a capacitor.

7. In a refrigeration apparatus having a source of cooling, a compartment to be cooled, a passage between said cooling source and said compartment, a baffle across said passage, said baffle having an open position allowing movement of air through said passage and a closed position preventing said movement of air, a first solenoid coil for moving said baffle to said open position and a second solenoid coil for moving said baffle to said closed position, a circuit for controlling said first and second solenoid coils comprising:

temperature sensing means for generating an analog voltage inversely related to a temperature within said compartment;

user selection means for generating a set point analog voltage directly related to a user selectable set point temperature value;

timer means for generating an analog voltage representing an elapsed time;

first comparator means coupled to said temperature sensing means and said timer means;

second comparator means coupled to said user selection means and said timer means;

first switching means coupling said first comparator means with said first solenoid coil to controllably energize said first solenoid coil to open said baffle when said analog voltage of said timer means exceeds said analog voltage for said temperature sensing means;

second switching means coupling said second comparator means with said second solenoid coil to controllably energize said second solenoid coil to close said baffle when said analog voltage of said timer means exceeds said analog voltage of said user selection means; and means for resetting said elapsed time of said timer means when said analog voltage of said timer means exceeds either of said analog voltage of said temperature sensing means or said analog voltage of said user selection means.

8. The control circuit according to claim 7 wherein said timer means defines a cycle and the control circuit energizes either said first solenoid coil or said second solenoid coil once each cycle.

9. The control circuit according to claim 7 wherein said temperature sensing means comprises a negative temperature coefficient thermistor.

10. The control circuit according to claim 7 wherein said timer means includes storing means for storing an electrical charge.

11. The control circuit according to claim 10 wherein said storing means comprises a capacitor.

12. The control circuit according to claim 10 wherein said timer means is coupled to said first and second solenoid coils and the electrical charge is transferred from said timer means to either of said first or second solenoid coil to controllably energize either of said first or second solenoid coil and reset said timer.

13. The control circuit according to claim 7 further comprising an actuator coupled to said baffle and in magnetic relationship with said first and second solenoid coils whereby said first and second solenoid coils actuably move said actuator to move said baffle between said open and close positions.

14. In a refrigeration apparatus having a cabinet defining a below freezing compartment and an above freezing compartment separated by a wall, means defining a passage between said compartments and a baffle overlaying said passage, said baffle movable between an open position allowing movement of air from said below freezing compartment to said above freezing compartment and a closed position preventing said movement of air, an open solenoid coil for moving said baffle to said open position and a closed solenoid coil for moving said baffle to said closed position, a circuit for controllably energizing said solenoid coils, comprising:

first and second comparator means each having an inverting input, a non-inverting input, and an output whereby said output assumes a high voltage state when an analog voltage at said non-inverting input exceeds an analog voltage at said inverting input, and said output assumes a low voltage state when said analog voltage at said inverting input exceeds said analog voltage at said non-inverting input;

temperature sensing means for producing an analog voltage inversely proportional to a temperature within said compartment, said temperature sensing means being coupled to said inverting input of said first comparator means;

user selection means for producing an analog voltage directly proportional to a user selectable set point temperature value, said user selection means being coupled to said inverting input of said second comparator means;

a capacitor coupled to said non-inverting inputs of both said first and second comparators;

power supply means providing an electrical charge to said capacitor for producing an analog voltage, increasing with time, across said capacitor;

first and second switch means, said first switch means coupled between said output of said first comparator means and said open solenoid coil, and said second switch means coupled between said output of said second comparator means and said closed solenoid coil, for enabling current flow through said open or closed solenoid coil when said output of said first or second comparator means, respectively, is in said high voltage state; and means coupling said capacitor to said open and closed solenoid coils to transfer said charge to said open solenoid coil, discharging said capacitor and opening said baffle when current flow is enabled through said open solenoid coil, and to transfer said charge to said closed solenoid coil, discharging said capacitor and closing said baffle when current flow is enabled through said second solenoid coil.

15. The control circuit according to claim 14 wherein said temperature sensing means comprises a negative temperature coefficient thermistor.

16. The control circuit according to claim 14 wherein the user selection means comprises a voltage divider including a user selectable potentiometer.

17. The control circuit according to claim 14 wherein said switch means comprise silicon controlled rectifiers.

18. The control circuit according to claim 14 further comprising an actuator coupled to said baffle and in magnetic relationship with said first and second solenoid coils whereby said first and second solenoid coils actuably move said actuator to move said baffle between said open and close positions.

* * * * *